S. J. MILLER & L. WRIGHT,

Assignors to F. B. Hunt.

CORN-PLANTER.

No. 7,695.

Reissued May 22, 1877.

Witnesses:

T. C. Brecht.

M. Gardner.

Inventors:

Samuel J. Miller

Luna Wright

By F. B. Hunt & Co.

Attorneys

N. PETERS, PHOTO-LITHOGRAPHER, WASHINGTON, D. C.

UNITED STATES PATENT OFFICE.

SAMUEL J. MILLER AND LUNA WRIGHT, OF ECONOMY, ASSIGNORS TO FRANKLIN B. HUNT, OF RICHMOND, INDIANA.

IMPROVEMENT IN CORN-PLANTERS.

Specification forming part of Letters Patent No. 154,507, dated August 25, 1874; reissue No. 7,695, dated May 22, 1877; application filed October 12, 1875.

*To all whom it may concern:*

Be it known that we, SAMUEL J. MILLER and LUNA WRIGHT, of Economy, in the county of Wayne and State of Indiana, have invented a new and useful Improvement in Corn-Planters, of which the following is a specification:

This invention relates to machines for planting corn by means of a series of devices and combination of devices, whereby the whole operation is completed in a manner hereinafter fully explained in the specification and claims.

Figure 1:
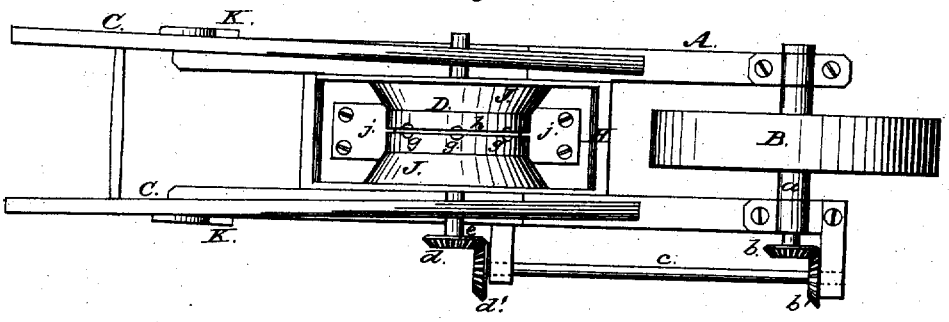
Figure 2:
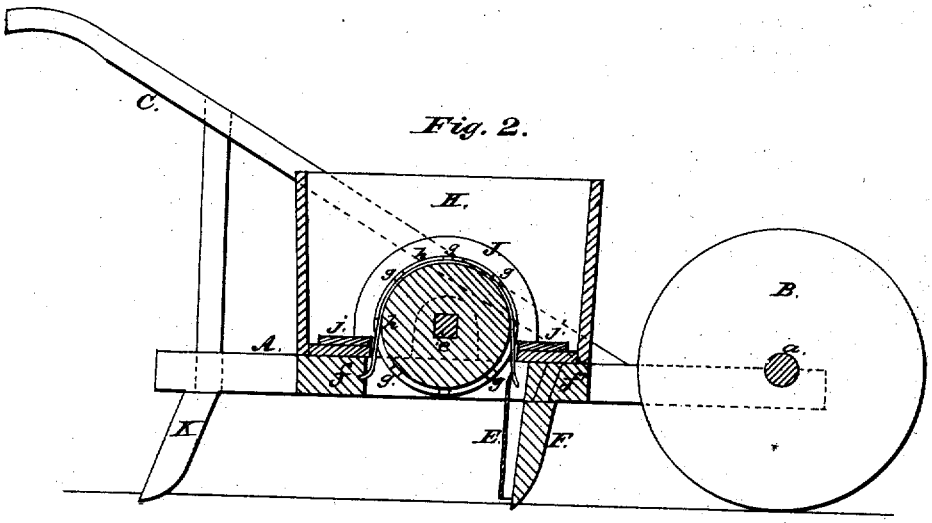
Figure 3:
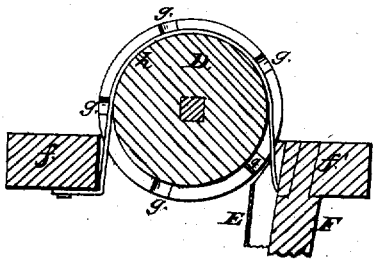

Figure 1 is a top or plan view. Fig. 2 is a longitudinal vertical section. Fig. 3 is a detail view.

A is the frame of the machine. B is the front ground-wheel; C C, the handles. The axle *a* of the wheel B carries a miter-wheel, *h*, on one end, which engages with a similar wheel, *b'*, and longitudinal shaft *c*. This shaft *c* connects the front ground-wheel and the revolving dropper in its rear, and has its end bearings in brackets which are secured to one side of the frame A, and it communicates rotary motion to the dropper D through the medium of the two miter-wheels *d d'*. The wheel *d* is keyed on the horizontal axis *e* of the dropper. Shaft *e* has its bearings in boxes which are secured upon the frame A, and is located between two cross-pieces, *f f'*. The dropper D is of circular form, having in its periphery a number of seed-cells, *g*, arranged at proper distances apart. There is also a groove in the periphery of the dropper, which intersects the axis of all the cells *g*, and above the plane of the frame A this groove receives a wire, *h*. One end of the wire *h* is secured to the cross-bar *f*, and the other end is secured to the upper end of a seed-tube, E, which is secured to the back of a tooth, F. At the point for discharging the seed into the tube E the wire *h* is set off from the periphery of the dropper, so as to insure the discharge of the grain from the cells as they successively move around. At all other points the wire *h* lies on the bottom of the cells. The dropper is applied between two arches, J J, which are constructed with inwardly-beveled surfaces, which will direct the corn in the hopper H upon the dropper. This dropper is of more than ordinary diameter, in order that many of the seed-cells may be in the grain at the same time, and more than half the circumference of the dropper is exposed, as seen in Fig. 2.

This construction of dropper requires the hopper-bottom to be curved and inclined, in order that a large portion of the dropper may remain exposed, and by means of the curved and inclined bottom of the hopper the grain is pressed upon the dropper, which travels a long distance through the grain before the kernels are discharged into the seed-tube, causing the cells to fill with great certainty.

We are aware that vertical seed-droppers are not new; but such a dropper as we use has not heretofore been placed in our organization of machine—viz., a seed-hopper supported upon a frame having a single ground-wheel, and a tooth or colter and seed-tube arranged between said wheel, and covering-blades in the rear attached to said frame, in combination with a dropper revolving upon a horizontal axis, whereby the grain is discharged into the tube. The small droppers heretofore used have not been practically introduced, from the fact that their small exposed surface was not sufficient to enable them to operate successfully.

Our large dropper has a seed-hopper with a bottom curving and extending down somewhat below the axis of the dropper.

Another advantage in our construction is, that it is cheaper to construct and much less liable to get out of order.

The horizontal dropper is very liable to clog by means of the chaff working in between the dropper and the plate below it, while our dropper extends up between the edges of the curved bottom, and the chaff will readily pass down and out at the vertical sides of the dropper without the possibility of clogging.

The seed is prevented from crowding out of the hopper by means of two rubber wipers, *j j*, which are secured upon the cross-bars *f f'*, so that their free edges press against the periphery of the dropper. These wipers keep back the grains, and at the same time prevent them from being broken.

K K are covering-blades attached to the rear of the frame.

What we claim as new, and desire to secure by Letters Patent, is—

1. A corn-planter having a seed-dropper with cells in its periphery placed in rear of a single front wheel, and revolving upon a horizontal axis, and driven from said wheel by means of a longitudinal shaft, substantially as set forth.

2. A revolving seed-dro per having cells in its periphery, in combination with a seed-hopper having a curved inclined bottom, whereby the grain is directed into the cells, substantially as set forth.

3. In combination with frame A, and a seed-hopper having a curved inclined bottom, a revolving seed-dropper and tube, E, substantially as set forth.

4. In combination with a seed-hopper having a curved inclined bottom, the revolving dropper and tube E, arranged in rear of tooth F, substantially as set forth.

5. In combination with a seed-dropper having a groove and cells in its periphery, a seed-hopper having a curved inclined bottom, whereby the grain is directed into the cells, substantially as set forth.

6. In combination with the frame and re volving seed-dropper, a hopper with a curved inclined bottom tooth, F, and tube E, substantially as set forth.

7. The seed-hopper attached to the frame A, in combination with a revolving seed-dropper having a groove and cells in its periphery, grain-tube E, and covering-blades K, substantially as set forth.

8. In combination with the frame A, tooth F, tube E, revolving dropper, and a seed-hopper having a curved inclined bottom, covering-blades K, substantially as set forth.

9. A seed-dropper revolving upon a horizontal axis, and having cells in its periphery, in combination with frame A, ground-wheel B, hopper with curved inclined bottom tooth F, tube E, and covering-blades K, substantially as set forth.

SAMUEL J. MILLER.
LUNA WRIGHT.

Witnesses for S. J. Miller:
W. W. ORR,
J. L. SIMMONS.

Witnesses for Luna Wright:
JOHN M. WILLIAMS,
JOHN A. WRIGHT.